United States Patent
Walker et al.

(10) Patent No.: US 9,396,224 B2
(45) Date of Patent: *Jul. 19, 2016

(54) SYSTEMS AND METHODS FOR SORTING, GROUPING, AND RENDERING SUBSETS OF LARGE DATASETS OVER A NETWORK

(71) Applicant: AppFolio, Inc., Goleta, CA (US)

(72) Inventors: Jonathan Walker, Santa Barbara, CA (US); Paul Kmiec, Portland, OR (US); Comron Sattari, Chicago, IL (US); James Herzberg, Portland, OR (US)

(73) Assignee: AppFolio, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,277

(22) Filed: May 15, 2015

(65) Prior Publication Data

US 2015/0248451 A1   Sep. 3, 2015

Related U.S. Application Data

(63) Continuation of application No. 12/637,141, filed on Dec. 14, 2009, now Pat. No. 9,053,200.

(51) Int. Cl.
*G06F 17/30* (2006.01)
*H04L 29/08* (2006.01)
*G06Q 50/16* (2012.01)

(52) U.S. Cl.
CPC ...... *G06F 17/30336* (2013.01); *G06F 17/3056* (2013.01); *G06F 17/30132* (2013.01); *G06F 17/30864* (2013.01); *G06F 17/30867* (2013.01); *G06F 17/30893* (2013.01); *G06F 17/30905* (2013.01); *H04L 67/06* (2013.01); *G06F 17/30902* (2013.01); *G06Q 50/163* (2013.01)

(58) Field of Classification Search
CPC ............... G06F 17/30867; G06F 17/30905; H04L 67/06
See application file for complete search history.

(56) References Cited

U.S. PATENT DOCUMENTS

| | | | | |
|---|---|---|---|---|
| 5,815,194 | A * | 9/1998 | Ueda | H04N 21/47202 348/E7.071 |
| 6,167,438 | A * | 12/2000 | Yates | G06F 17/30902 707/E17.12 |
| 6,347,314 | B1 * | 2/2002 | Chidlovskii | G06F 17/30949 |
| 6,377,957 | B1 * | 4/2002 | Jeyaraman | G06F 17/30575 707/625 |
| 6,442,658 | B1 * | 8/2002 | Hunt | G11B 27/105 348/E7.061 |
| 6,457,021 | B1 * | 9/2002 | Berkowitz | G06F 17/30371 |
| 6,665,676 | B2 * | 12/2003 | Twig | G06Q 10/025 |
| 7,043,469 | B2 * | 5/2006 | Goralwalla | G06F 17/3041 |

(Continued)

OTHER PUBLICATIONS

Office Action on U.S. Appl. No. 12/637,141 dated Dec. 8, 2014.

(Continued)

*Primary Examiner* — Aaron Strange
(74) *Attorney, Agent, or Firm* — John D. Lanza; Foley & Lardner LLP

(57) ABSTRACT

Systems and methods for sorting, grouping, and rendering subsets of large datasets over a network are described. Records may be sorted according to a user input, and the system may identify the subset of records that would be displayed on a client. The system may render for display only the identified records. Additionally, the system may render and cache records proximate to the identified records. Further, the system may perform searches upon the records and use the search results to further find results for a refined search.

20 Claims, 12 Drawing Sheets

(56) References Cited

U.S. PATENT DOCUMENTS

| | | | | |
|---|---|---|---|---|
| 7,305,697 | B2* | 12/2007 | Alao | H04N 21/812 |
| | | | | 348/E7.07 |
| 7,958,105 | B2* | 6/2011 | Leff | G06F 21/6227 |
| | | | | 707/706 |
| 2001/0005850 | A1* | 6/2001 | Graham | G06F 3/0485 |
| 2004/0054763 | A1* | 3/2004 | Teh | H04L 45/00 |
| | | | | 709/221 |
| 2004/0267648 | A1* | 12/2004 | Schaub | G06Q 10/10 |
| | | | | 705/35 |

OTHER PUBLICATIONS

Office Action on U.S. Appl. No. 12/637,141 dated Mar. 19, 2013.
Office Action on U.S. Appl. No. 12/637,141 dated Nov. 5, 2012.

* cited by examiner

FIG. 3a propertyDirectoryEXReport - Windows Picture and Fax Viewer  — □ ⌧

⟲ REFRESH  ⚙ FILTERS  ⬇ EXPORT  🖨 PRINT  ✉ EMAIL  💾 SAVE

Property Directory

| Property ▲ | Market Rent | Units | Sq. Ft. | Management Fee | Minimum Fee | Reserve | Insurance Expiration | Tax Year End | Owner(s) | Description |
|---|---|---|---|---|---|---|---|---|---|---|
| Aaa01 - 100 Oak Street, Chicago IL, 60613 | 899.00 | 1 | 768.00 | 8.00% | 0.00 | 0.00 | | 12 | XXX Investments, LLC | |
| Aac01 - 24 Elm Street, Lake Lee TX, 12845 | 795.00 | 1 | 1000.00 | 6.50% | 0.00 | 400.00 | | 12 | Owner 1 | |
| Aad01 - 42 Harrison Ave., Wyckoff NJ, 07645 | 1,995.00 | 1 | 2,558.00 | 7.00% | 0.00 | 300.00 | | 12 | Account # 123 | |
| Aad01 - 130 East Ave., Chitin NY, 78946 | 795.00 | 1 | 832.00 | 7.00% | 0.00 | 50.00 | | 12 | Owner 2 - Office | |
| Aae01 - 123 Park Ave, Layette GA, 99841 | 995.00 | 1 | 1,318.00 | 8.00% | 0.00 | 400.00 | | 12 | Owner 3 - Office | |
| Aaf01 - 71 First Street, East Hampton RI, 21876 | 1,500.00 | 2 | 1,780.00 | 8.00% | 0.00 | 200.00 | | 12 | Account # 234 | |
| Aag02 - 344 NE 7th St., Grenton CO, 66011 | 1,570.00 | 2 | 1,074.00 | 8.00% | 0.00 | 230.00 | | 12 | Account # XXY | |
| Aah03 - 8 Midnight Drive, Laurance TX, 77847 | 1,590.00 | 2 | 2,148.00 | 8.00% | 0.00 | 200.00 | | 12 | Owner 4 | |
| Baa01 - 250 Silver Ave, Chicago IL, 60613 | 999.00 | 1 | 1,024.00 | 9.00% | 0.00 | 400.00 | | 12 | YYY Investments, LLC | |
| Bab02 - 14 Maple Street, Lake Lee TX, 12845 | 875.00 | 1 | 0.00 | 8.00% | 0.00 | 300.00 | | 12 | Owner 5 | |
| Bac01 - 12 Bergoin Ave., Patterson NJ, 07645 | 995.00 | 1 | 1,158.00 | 7.00% | 0.00 | 300.00 | 12/11/1998 | 12 | Account #345 | |
| Bad03 - 88 Front St., Chitin NY, 78946 | 1,295.00 | 1 | 1,432.00 | 7.00% | 0.00 | 300.00 | | 12 | XXX Properties LLC | |
| Bae01 - 6 Elm Ave., Layette GA, 99841 | 1,295.00 | 1 | 1,216.00 | 7.00% | 0.00 | 69.93 | | 12 | XXX Properties LLC | |
| Baf01 - 99 Second Street, Hampton RI, 21876 | 999.00 | 1 | 0.00 | 7.00% | 0.00 | 69.93 | | 12 | XXX Properties LLC | |
| Bag02 - 21 Locust Blvd, Oaken, CA 66011 | 1,050.00 | 1 | 0.00 | 7.00% | 0.00 | 73.60 | | 12 | XXX Properties LLC | |
| Bah03 - 9 Okley Drive, Laforty, TX 77847 | 1,050.00 | 1 | 0.00 | 7.00% | 0.00 | 73.50 | | 12 | XXX Properties LLC | |
| Bai02 - 21 Locust Blvd, Oaken, CO 66011 | 999.00 | 1 | 1496.00 | 7.00% | 0.00 | 69.93 | | 12 | XXX Properties LLC | |
| Baj03 - 56 Marvin Way, Orlando, AR 77847 | 1,050.00 | 1 | 1,500.00 | 7.00% | 0.00 | 74.20 | | 12 | XXX Properties LLC | |
| Bak01 - 778 NE Blvd, Groton, MA 02247 | 1,095.00 | 1 | 1,400.00 | 7.00% | 0.00 | 69.93 | | 12 | XXX Properties LLC | |
| Bal02 - 4 Harvard Way, Lauton, CA, 64022 | 1,050.00 | 1 | 1,200.00 | 7.00% | 0.00 | 71.75 | | 12 | XXX Properties LLC | |
| Total | 22,891.00 | 23 | 21,904.00 | | | | | | | |

Submit Feedback    Find [    ] ⌧ 🔍

219 Results

300

FIG. 3b propertyDirectoryEXReport - Windows Picture and Fax Viewer

Property Directory — REFRESH | FILTERS | EXPORT | PRINT | EMAIL | SAVE

| Property ▲ | Market Rent | Units | Sq. Ft. | Management Fee | Minimum Fee | Reserve | Insurance Expiration | Tax Year End | Owner(s) | Description |
|---|---|---|---|---|---|---|---|---|---|---|
| Bam03 - 81 Oak Bow Drive, Lee, TX 77847 | 1,050.00 | 1 | 1,460.00 | 7.00% | 0.00 | 82.25 | | 12 | XXX Properties LLC | |
| Ban02 - 7 oak Street, Marlton, FL 12999 | 1,002.00 | 1 | 1,126.00 | 7.00% | 0.00 | 71.75 | | 12 | XXX Properties LLC | |
| Bao01 - 3020 Park St South Orange, NJ 12801 | 1,095.00 | 1 | 0.00 | 0.00% | 85.00 | 2695.00 | 12/11/1998 | 12 | Owner 5 - Home | |
| Bap01 - 1 State Street Lookout, NY 12746 | 895.00 | 1 | 1,632.00 | 9.00% | 0.00 | 400.00 | | 12 | Owner 6 - Home | |
| Baq01 - 23 Harbor Ave. Gary, GA 44841 | 1,295.00 | 1 | 1,648.00 | 8.00% | 0.00 | 400.00 | | 12 | Owner 7 - Office | |
| Baq02 - 698 Lober Lane, Kent, Va 55581 | 750.00 | 1 | 920.00 | 8.00% | 0.00 | 300.00 | | 12 | Account #789 | |
| Cab01 - 3 12th Ave. Porter, CA 66011 | 699.00 | 1 | 950.00 | 8.00% | 0.00 | 300.00 | | 12 | XYZ Holdings LLC | |
| Cab01 - 14 Sheridon La. Plano, TX 74427 | 1,275.00 | 1 | 1,845.00 | 0.00% | 75.00 | 100.00 | 12/11/1998 | 12 | XYZ Holdings LLC | |
| Cad01 - 81 West Ave. Chicago, IL 60613 | 1,275.00 | 1 | 1,400.00 | 0.00% | 0.00 | 300.00 | | 12 | XYZ Holdings LLC | |
| Cad02 - 77 Maple Drive, Long Lake, Wy, 99945 | 850.00 | 1 | 650.00 | 7.00% | 0.00 | 300.00 | | 12 | Owner 8 - Home | |
| Cae01 - 55 Wise Lane, Patterson, NJ 07645 | 525.00 | 1 | 2,173.00 | 7.00% | 0.00 | 400.00 | | 12 | XXX Properties LLC | |
| Caf01 - 88 Front St., Chitin, NY 78946 | 1,295.00 | 1 | 2,432.00 | 7.00% | 0.00 | 0.00 | | 12 | XXX Properties LLC | |
| Cag01 - 72 Elmhurst Ave. Lago, GA 99876 | 1,295.00 | 1 | 2,016.00 | 8.00% | 0.00 | 300.00 | | 12 | XXX Properties LLC | |
| Cah01 - 52 Oakbow La. Conty, NY 14826 | 999.00 | 1 | 1,934.00 | 8.00% | 0.00 | 300.00 | | 12 | XXX Properties LLC | |
| Cah02 - 12 Locust Blvd, Conty, NY 14826 | 1,050.00 | 2 | 1,152.00 | 8.00% | 0.00 | 200.00 | | 12 | XXX Properties LLC | |
| Cai01 - 42 Harrison Ave. Holly, PA 77918 | 1,050.00 | 1 | 1,375.00 | 9.00% | 0.00 | 100.00 | 12/10/1998 | 12 | XXX Properties LLC | |
| Caj02 - 21 Locust Blvd., Oaken, CA 66011 | 999.00 | 1 | 1,895.00 | 0.00% | 0.00 | 400.00 | | 12 | XXX Properties LLC | |
| Caj03 - 56 Marvin Way, Orlando, AR 77847 | 1,050.00 | 2 | 1,400.00 | 7.00% | 0.00 | 60.20 | | 12 | XXX Properties LLC | |
| Caj01 - 2 SW Blvd. Moton, MA 02247 | 1,095.00 | 1 | 1,896.00 | 7.00% | 0.00 | 400.00 | | 12 | XXX Properties LLC | |
| Caj02 - 747 Conny Way Overton, PA 64022 | 1,050.00 | 2 | 1,524.00 | 0.00% | 0.00 | 100.00 | 12/11/1998 | 12 | XXX Properties LLC | |
| Daa01 - 81 Oak Drive, Lee, TX 77844 | 1,050.00 | 1 | 2,422.00 | 8.00% | 0.00 | 300.00 | | 12 | XXX Properties LLC | |
| Total | 21,644.00 | 24 | 31,852.00 | | | | | | | |

Submit Feedback | Find

220 Results

FIG. 4a 410  415  420  425  430  435  440  445 unitDirectoryEXReport - Windows Picture and Fax Viewer — [MAIL] [SAVE]

Property Directory    [REFRESH] [FILTERS] [EXPORT] [PRINT]

| Unit Name | Market Rent | Default Deposit | Square Ft. | Bedrooms ▼ | Bathrooms | Unit Type | Description |
|---|---|---|---|---|---|---|---|
| Aaf01 - 344 NE 7th St., Grenton, OR 66011 | | | | | | | |
| 344 | 1,395.00 | 1,200.00 | 2,100.00 | 4 | 2.50 | | Living room, dinning room, kitchen with gas range |
| Baa01 - 250 Silk Street, Chicago, IL 99432 | | | | | | | |
| 250 | 1,070.00 | 800.00 | 1,800.00 | 4 | 2.00 | | Appliance: Range; Furniture: W/D hkup; Utilities |
| Bab01 - 14 Maple Street, Lake Lee, TX 12844 | | | | | | | |
| 14 | 1,295.00 | 1,100.00 | 2,000.00 | 3 | 2.00 | | Living room with gas fireplace, dinning area, kitch |
| Bac01 - 12 Bergoin Ave., Patterson, NJ 07645 | | | | | | | |
| 12 | 1,095.00 | 900.00 | 1,014.00 | 3 | 1.00 | | Appliance: Range, D/W; Furniture: W/D hkup (gas |
| Bad01 - 88 Front St., Chitiniton, NY 12888 | | | | | | | |
| 88 | 695.00 | 500.00 | 874.00 | 2 | 1.50 | | Appliance: R/R, D/W; Furniture: W/D hkup; Utilities |
| 90 | 699.00 | 500.00 | 880.00 | 3 | 2.00 | | Appliance: R/R, D/W; Furniture: W/D hkup; Utilities |
| 455 | 1,394.00 | 1,000.00 | 1,680.00 | 6 | 3.50 | | |
| | | | | 460 | | | |
| Caa01 - 6221 Red Bow Ave., Oakly, FL 88762 | | | | | | | |
| 6221 | 1,395.00 | 1,400.00 | 1,810.00 | 4 | 2.00 | | Appliance: R/R, D/W; Furniture: W/D; Utilities |
| Cab01 - 42 Harrison Ave., Wall, Utah 11472 | | | | | | | |
| 42 | 1,280.00 | 1,000.00 | 1,562.00 | 4 | 1.00 | | Appliance: R/R; Furniture: W/D; Utilities; Gas H |
| Total | 8,924.00 | 7,400.00 | 10,166.00 | 27 | 14.00 | | |

Submit Feedback | Find [  ] [X] [🔍]                                    275 Results

| Property Directory | | | | | | |
|---|---|---|---|---|---|---|
| Unit Name | Market Rent | Default Deposit | Square Ft. | Bedrooms ▼ | Bathrooms ▼ | Unit Type Description |
| Cac01 - 799 NE State St., Huntington, MA 99745 | | | | | | |
| 799 | 635.00 | 275.00 | 0.00 | 2 | 1.00 | Appliance: R/R: Furniture: W/D: Utilities: Gas H |
| Cad01 - 882 SW Bridge Way, Lexington, OR 66921 | | | | | | |
| 882 | 1,595.00 | 1,400.00 | 2,540.00 | 5 | 3.00 | Living room, dinning area, kitchen with dinette, |
| Cae01 - 25 Madden Street, Chicago, IL 99432 | | | | | | |
| 25 | 1,195.00 | 1,000.00 | 2,100.00 | 4 | 2.00 | Appliance: Range, DW: Furniture: W/D coop: |
| Caf01 - 471 Lexington Ave., Allentown, TX 12844 | | | | | | |
| 471 | 1,095.00 | 900.00 | 1,200.00 | 3 | 1.00 | Living room with gas fireplace, dinning room, kitchen |
| Cag01 - 12 Beldon Ave., Littleton, NJ 07677 | | | | | | |
| 12 | 825.00 | 700.00 | 0.00 | 3 | 1.00 | Appliance: R, DW: Furniture: W/D coop: Utilities |
| Cah01 - 19672 Apple Ann Way, Wallingford, NY 12841 | | | | | | |
| 19672 | 750.00 | 600.00 | 1,600.00 | 2 | 1.00 | Appliance: R/R, DW: Furniture: W/D coop: Utilities |
| Total | 6,095.00 | 4,875.00 | 5,840.00 | 19 | 9.00 | |

261 Results

SYSTEMS AND METHODS FOR SORTING, GROUPING, AND RENDERING SUBSETS OF LARGE DATASETS OVER A NETWORK

RELATED APPLICATIONS

This application is a continuation of and claims priority to U.S. patent application Ser. No. 12/637,141, filed Dec. 14, 2009, which is incorporated by reference herein in its entirety.

FIELD OF THE INVENTION

The present invention relates to network applications, and more specifically, means of sorting, grouping, and rendering subsets of large datasets over a network.

BACKGROUND OF THE INVENTION

Data management capabilities conventionally provided by software for installation on computing systems have increasingly become available via web-based services. When users create accounts with Software as a Service (SaaS) providers, the users may transfer datasets with numerous records, sometimes numbering in the thousands or millions, to the service providers' servers. However, the web browser memories constrain users' abilities to remotely access their records. Because the memories can hold information only for a limited number of records, information for the records the user wishes to access may easily overflow web browser memories. For example, a property management company may store records for thousands of properties on a service providers' servers. A company may wish to retrieve records for properties owned by a particular landlord or properties whose rent is past due. When a company manages thousands of properties, the number of properties meeting such criteria could easily overflow the limited memory of a web browser.

BRIEF SUMMARY OF THE INVENTION

Software as a Service (SAAS) enables customers to leverage a service provider's superior infrastructure to manage data. Storing large datasets on a service provider's servers alleviates the need to acquire and maintain equipment. Strategic communication between end client devices used by customers and the servers may enable customers to access targeted records in the datasets despite the limited processing and storage capacity of the web browsers used for viewing the records.

In one aspect, the present invention relates to methods of rendering a subset of ordered records on a web browser. In one embodiment, the method includes receiving a first input associated with an ordering for records, a second input associated with an index into the ordered records, and a third input associated with a size of a memory element associated with a web browser from a client; ordering the records according to the first input; determining a subset of the ordered records to render according to the second and third inputs; and transmitting a rendered subset of the ordered records for display on a web browser at the client.

In various embodiments, the method also includes caching the subset of the records for display on the web browser. In some embodiments, the method also includes receiving a fourth input associated with a second index into the ordered records; determining a second subset of the ordered records to render according to the third and fourth inputs; determining that a portion of the second subset is stored in the cache; and transmitting the portion of the second subset from the cache and a remainder of the second subset to the client. In many embodiments, the method also includes receiving a fourth input associated with a second index into the ordered records; determining a second subset of the ordered records to render according to the third and fourth inputs; and transmitting the second subset of the records for display on a web browser at the client. In additional embodiments, the method also includes calculating a subtotal from fields in a group of records in the subset and transmitting the subtotal to the client. In various embodiments, the method also includes determining a second subset of the ordered records proximate to the first subset; and transmitting the second subset to the client for storage.

In another aspect, the present invention relates to computer implemented systems for rendering a subset of ordered records on a web browser. In one embodiment, the system includes a transceiver in communication with a client that receives inputs associated with a desired subset of records from a user at the client and transmits subsets of records for display on a web browser at the client; and a processor that receives a first input associated with an ordering for records, a second input associated with an index into the ordered records, and a third input associated with a size of a memory element associated with a web browser from a client; orders the records according to the first input; and determines a subset of the ordered records to render according to the second and third inputs.

In many embodiments, the system includes a cache that stores the subset of the records for display on the web browser. In further embodiments, the processor determines a second subset of the ordered records to render according to the third input and a fourth input associated with a second index into the ordered records, determines that a portion of the second subset of the ordered records is stored in the cache; and transmits the portion of the second subset from the cache and a remainder of the second subset to the client. In various embodiments, the processor determines a second subset of the ordered records to render according to the third input and a fourth input associated with a second index into the ordered records and transmits the second subset of the records for display on a web browser at the client. In numerous embodiments, the processor calculates a subtotal from fields in a group of records in the subset and the transceiver transmits the subtotal to the client. In many embodiments, the processor determines a second subset of the ordered records proximate to the first subset and the transceiver transmits the second subset to the client for storage.

In another aspect, the present invention relates to methods of rendering a subset of ordered property records on a web browser. In one embodiment, the method includes receiving a first input associated with an ordering for property records, a second input associated with an index into the ordered property records, and a third input associated with a size of a memory element associated with a web browser from a client; ordering the property records according to the first input; determining a subset of the ordered property records to render according to the second and third inputs; and transmitting a rendered subset of the ordered property records for display on a web browser at the client.

In various embodiments, the method also includes caching the subset of the property records for display on the web browser. In some embodiments, the method also includes receiving a fourth input associated with a second index into the ordered property records; determining a second subset of the ordered property records to render according to the third and fourth inputs; determining that a portion of the second subset is stored in the cache; and transmitting the portion of the second subset from the cache and a remainder of the second subset to the client. In many embodiments, the method also includes receiving a fourth input associated with a second index into the ordered property records; determining a second subset of the ordered property records to render according to the third and fourth inputs; and transmitting the second subset of the property records for display on a web browser at the client. In additional embodiments, the method also includes calculating a subtotal from fields in a group of property records in the subset and transmitting the subtotal to the client. In various embodiments, the method also includes determining a second subset of the ordered property records proximate to the first subset; and transmitting the second subset to the client for storage.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIGS. 3A and 3B are example displays of rendered records that does not exhibit groups;

FIGS. 4A and 4B are an example displays of rendered records that exhibit groups and subtotals;

DETAILED DESCRIPTION OF THE INVENTION

Figure 1A:
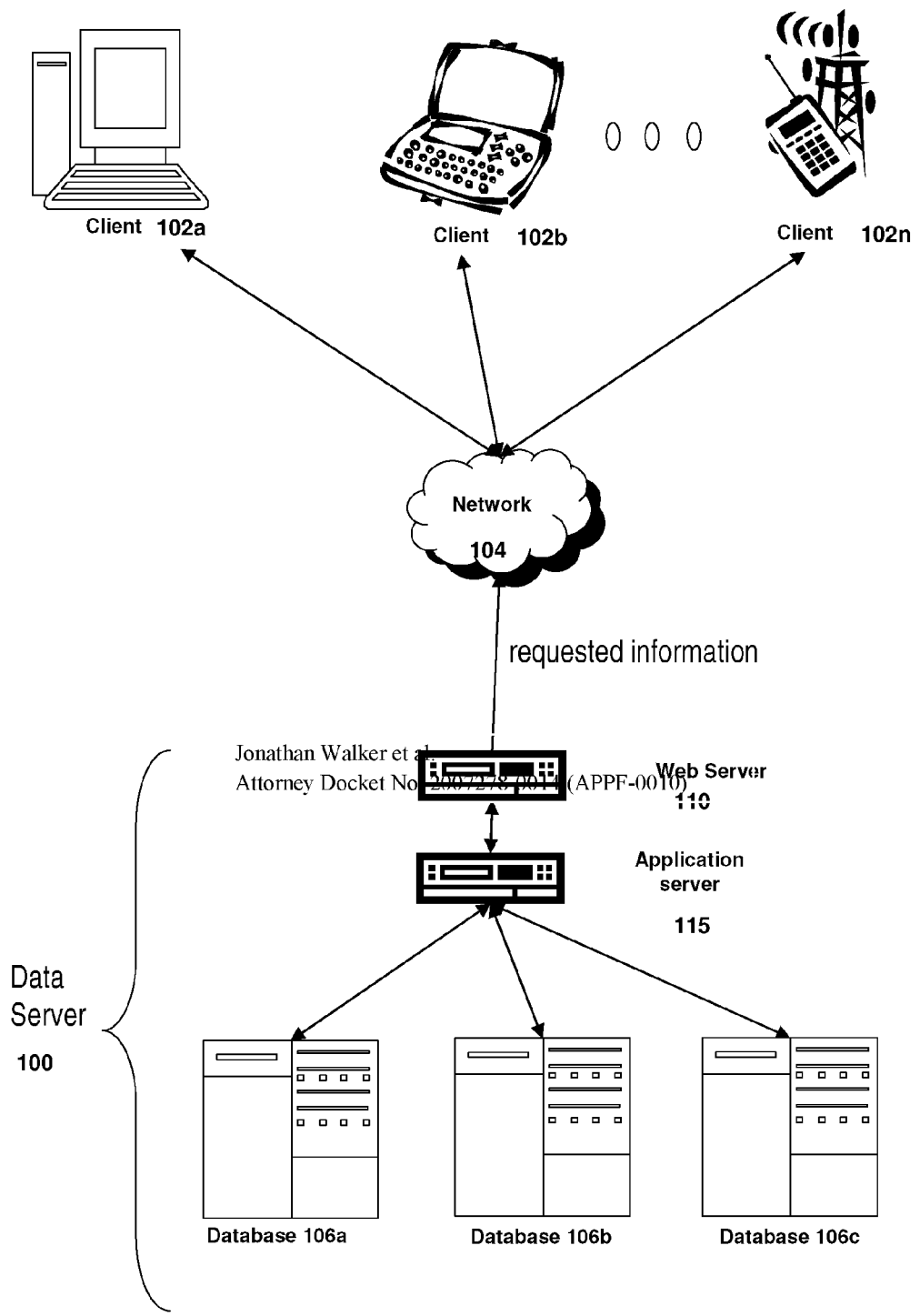
FIG. 1A is a block diagram of an embodiment of a system for sorting, grouping, and rendering subsets of large datasets over a network.

Referring now to FIG. 1A, a block diagram of an embodiment of a system for sorting, grouping, and rendering subsets of large datasets over a network is shown. In brief overview, a number of clients, 102a, 102b, ... 102n (generally 102), are connected via a network 104 to a data server 100. The data server 100 may comprise a number of elements including a web server 110, an application server 115, and a number of databases 106a, 106b, and 106c (generally 106) for storing datasets. The datasets may include any type and kind of data, which may be grouped and/or organized into records.

Referring to FIG. 1A, now in greater detail, a number of clients 102 are shown. A client may comprise any computing device capable of sending or receiving information. Examples of clients 102 may include personal computers, laptop computers, desktop computers, personal digital assistants, and mobile phones. A client 102 may include a display device, such as a monitor or screen, for displaying received data from the data server 100 to a user, and an input device, such as a keyboard or mouse, for accepting input of data corresponding to a request for data.

As shown, the clients 102 are connected to a data server 100 via a network 104. The network 104 may comprise the Internet, local networks, web servers, file servers, routers, load balancers, databases, computers, servers, network appliances, or any other computing devices capable of sending and receiving information. The network 104 may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, POP, IMAP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 104 may comprise mobile telephone networks utilizing any protocol or protocols used to communicate among mobile devices, including AMPS, TDMA, CDMA, GSM, GPRS or UMTS. The network may comprise a plurality of physically distinct networks, and the network may comprise a plurality of sub-networks connected in any manner.

A data server 100 may comprise any server or servers capable of sending and receiving data. A data server 100 may perform any function related to the processing and delivery of data, including without limitation receiving and processing web page input corresponding to requests for records at a position in the dataset, sorting and/or grouping records according to web page input, serving web pages presenting the requested records, and storing records. In one embodiment, a data server 100 may be implemented using an application server model, wherein a web server 110 handles web requests from clients and serves pages, an application server 115 coordinates logic for record sorting, grouping, and/or rendering records, and a number of databases 106 manage the records. In another embodiment, a data server may be implemented using a distributed, scalable, fault-tolerant, redundant server architecture.

A data server 100 may include one or more databases for storing the records. A database may manage the records. In some embodiments, data in the records may be associated with property management and may include without limitation addresses of properties, property descriptions, market rents, security deposit amounts, property sizes, management fees, and owners. In some embodiments, data in the records may be associated with inventory management and may include without limitation quantities of inventory, product names, vendors, storage locations, retail prices, and dates of receipt. In some embodiments, data in the records may be associated with transactions and accounting and may include without limitation the transaction type, transaction amount, financial account number, payor, or payee. A database may comprise any storage of data on any hardware and in any format. Databases may include, without limitation, flat file structures, SQL databases, object-oriented databases, and relational databases.

Figure 1B:
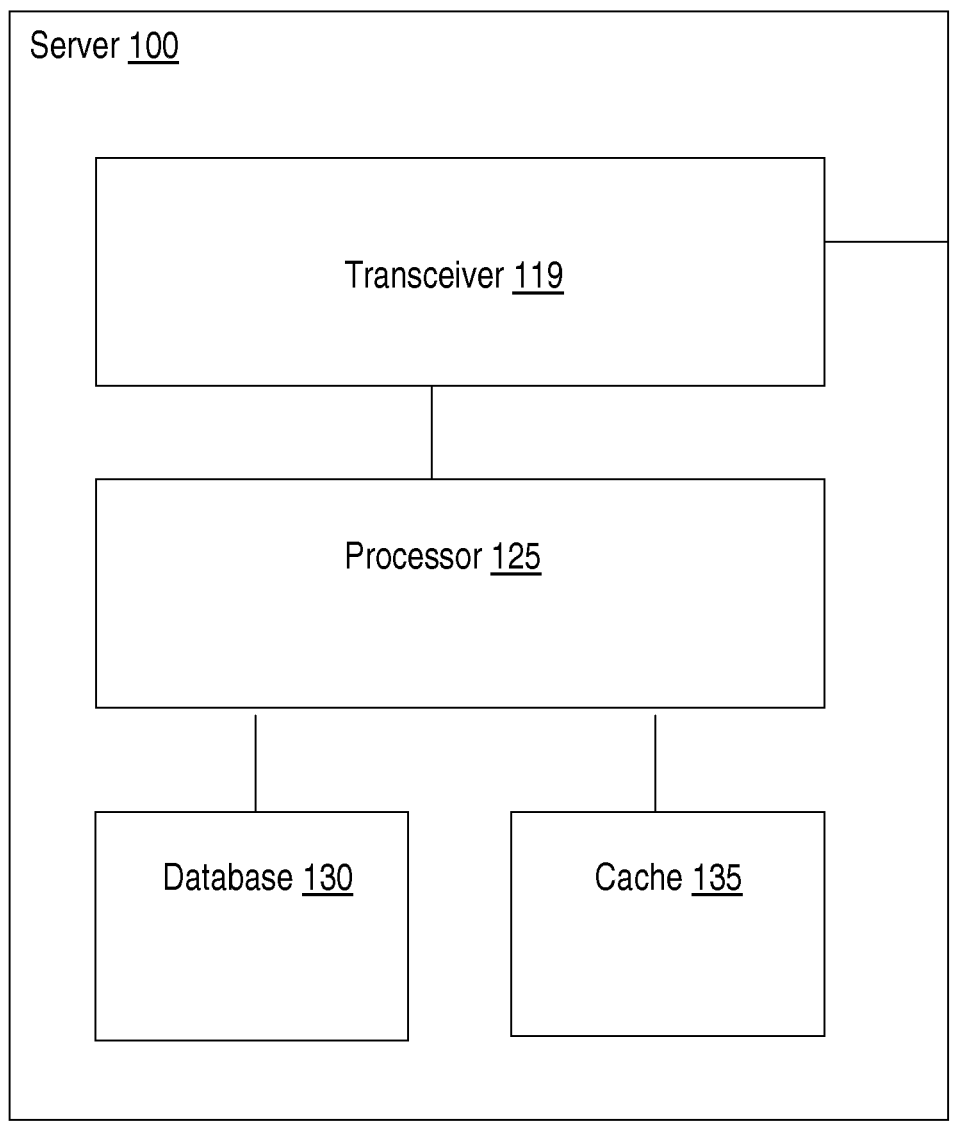
FIG. 1B is a block diagram of an embodiment of a data server for the system of FIG. 1A.

Referring now to FIG. 1B, a block diagram of an embodiment of a data server 100 is shown and described. In brief overview, the data server 100 includes a transceiver 119, a processor 125, a database 130, and a cache 135. The transceiver 119, processor 125, database 130, and cache 135 may occupy any of the elements of the data server 100. In one example, the transceiver 119 may occupy the web server 110. In another example, the processor 125 may occupy the application server 115. In yet another example, the database 130 and cache 135 may occupy the databases 106. In some embodiments, the cache 135 may occupy part of the database 130. In other embodiments, the cache 135 may form a separate entity from the database 130. In various embodiments, the cache 135 may include one or more buffers for storing parameters associated with rendered records for display or data of the rendered records. The buffers may include a primary buffer corresponding to a screen buffer for the display device on the client 102. The buffers may include a secondary buffer storing rendered records that are proximate to the records rendered for display on the client 102.

The data server 100 uses the transceiver 119 to communicate with the clients 102. The transceiver 119 may receive requests for records at a position in the records database from any of the clients 102. The transceiver 119 may transmit records rendered by the processor 125 according to the requests. The processor 125 may process the requests to retrieve records from the database 130; sort, group, and/or search the records according to the request; and identify the subset of records to render for display according to the request. The processor 125 may store copies of retrieved records in a buffer. The retrieved records may be further sorted, grouped, and/or searched according to user requests. In some embodiments, the retrieved records may be re-ordered to a default ordering.

In some embodiments, some or all of the data server elements may occupy the same physical machine, and may share any resources, including processors, memory, and communication links. In other embodiments, a data server element may be distributed across multiple scalable, fault-tolerant, redundant machines. In some embodiments, these machines may be geographically distributed across a number of sites.

Figure 1C:
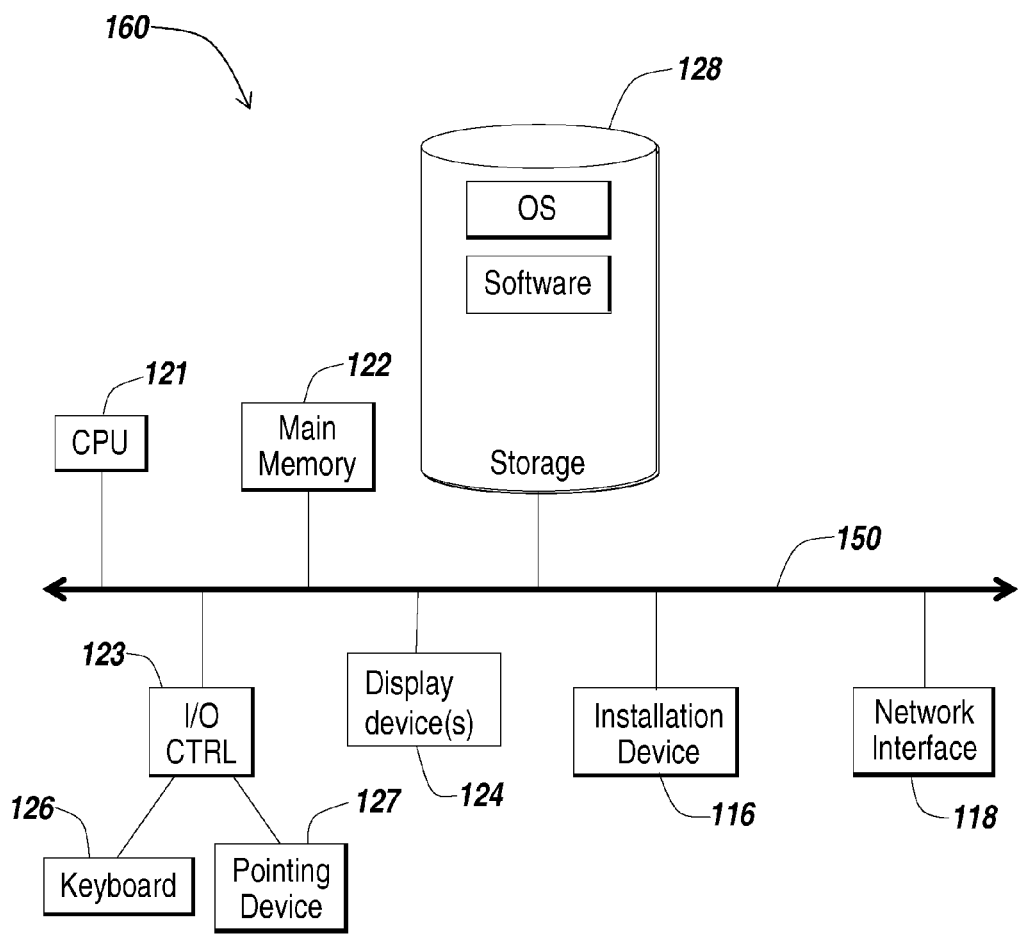
FIGS. 1C and 1D are block diagrams of example computing devices.
Figure 1D:
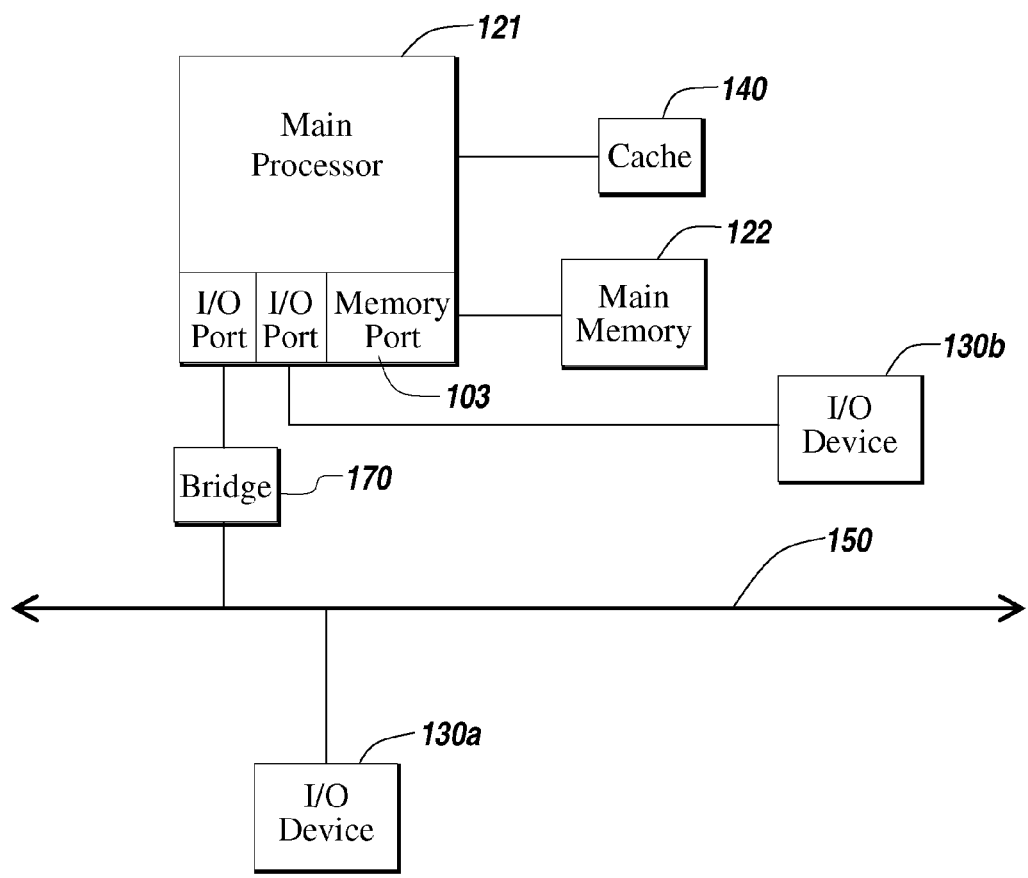

A client 102 and server 106 may be deployed as and/or executed on any type and form of computing device, such as a computer, network device or appliance capable of communicating on any type and form of network and performing the operations described herein. FIGS. 1C and 1D depict block diagrams of a computing device 160 useful for practicing an embodiment of the client 102 or a server 106. As shown in FIGS. 1C and 1D, each computing device 160 includes a central processing unit 121, and a main memory unit 122. As shown in FIG. 1C, a computing device 160 may include a visual display device 124, a keyboard 126 and/or a pointing device 127, such as a mouse. As shown in FIG. 1D, each computing device 160 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif.

In various embodiments, the central processing unit 121 may comprise multiple processors and may provide functionality for simultaneous execution of instructions or for simultaneous execution of one instruction on more than one piece of data. In some embodiments, the central processing unit 121 may comprise a parallel processor with one or more cores. In one of these embodiments, the computing device 160 is a shared memory parallel device, with multiple processors and/ or multiple processor cores, accessing all available memory as a single global address space. In another of these embodiments, the computing device 160 is a distributed memory parallel device with multiple processors each accessing local memory only. In still another of these embodiments, the computing device 160 has both some memory which is shared and some memory which can only be accessed by particular processors or subsets of processors. In still even another of these embodiments, the computing device 160, such as a multi-core microprocessor, combines two or more independent processors into a single package, often a single integrated circuit (IC). The computing device 160 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 160 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1E, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1D depicts an embodiment of a computer 100 in which the main processor 121 communicates directly with I/O device 130b via HyperTransport, Rapid I/O, or InfiniBand. FIG. 1E also depicts an embodiment in which local busses and direct communication are mixed: the processor 121 communicates with I/O device 130a using a local interconnect bus while communicating with I/O device 130b directly.

The computing device 160 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 160 may further comprise a storage device, such as one or more hard disk drives or redundant arrays of independent disks, Flash memory, or EEPROMs, for storing an operating system and other related software, and for storing application software programs. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 160 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., HTTP, TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 160 communicates with other computing devices 160' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 160 to any type of network capable of communication and performing the operations described herein.

A wide variety of I/O devices 130a-130b may be present in the computing device 160. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 160. In still other embodiments, the computing device 160 may provide USB connections to receive handheld USB storage devices such as the USB Flash Drive line of devices manufactured by Twintech Industry, Inc. of Los Alamitos, Calif.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 160 of the sort depicted in FIGS. 1C and 1D typically operates under the control of operating systems, which control scheduling of tasks and access to system resources. The computing device 160 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, and WINDOWS 7, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The computer system 160 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein.

An individual or organization may have an account with the data server 100. The data server 100 may store records associated with accounts and consequently, the account holders. When an account holder at a client seeks to view records, the data server 100 may present a subset of the records for display on the client and a user interface permitting the user to manipulate the records. The user interface may permit the user to sort records, search for records, or view different records within the account on the database. The user interface may include a toolbar and a track, wherein the length of the scroll bar is sized according to the number of records in the user's account. A user may manipulate the location of the toolbar to indicate which records the user wishes to view. The user interface may also include fields the user may manipulate to indicate how records should be sorted. For example, in a property management context, the user may click on the "Property Owner" field to sort the records by property owner name. In another example, in an accounting context, the user may click on the "Transaction Type" field to sort the records by the type of transaction. The user interface may also include fields that accept search parameters. The user may type input into the field to retrieve records according to the search parameters.

Figure 2:
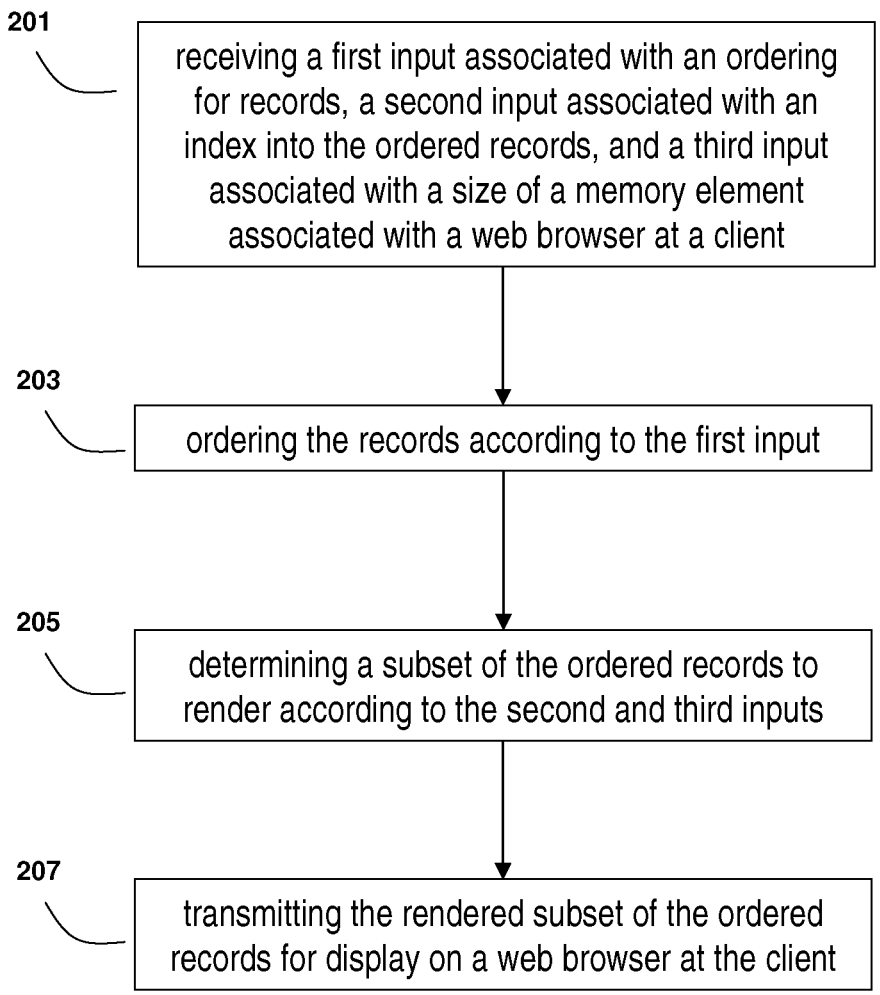
FIG. 2 is a flow diagram of a method for sorting, grouping, and rendering subsets of large datasets over a network.

Referring now to FIG. 2, a flow diagram of a method for sorting, grouping, and rendering subsets of large datasets over a network is shown. In brief overview, the method comprises: receiving a first input associated with an ordering for records, a second input associated with an index into the ordered records, and a third input associated with a size of a memory element associated with a web browser at a client (step 201); ordering the records according to the first input (step 203); determining a subset of the ordered records to render according to the second and third inputs (step 205); and transmitting the rendered subset of the ordered records for display on a web browser at the client (step 207).

Still referring to FIG. 2, now in greater detail, a method for sorting, grouping, and rendering subsets of large datasets over a network comprises receiving a first input associated with an ordering for records, a second input associated with an index into the ordered records, and a third input associated with a size of a memory element associated with a web browser from a client (step 201). In various embodiments, the data server 100 may receive the first, second, and third inputs. The server 100 may receive the inputs according to any communication protocol, including specialized protocols, for communicating with a client 102. In some embodiments, the server 100 may receive an HTTP request from a client 102, such as an HTTP get request. In many embodiments, the server 100 may receive an Ajax request from a client 102. Any communication between the client 102 and the server 100 described in reference to any of the FIGS. may occur through HTTP or Ajax requests. Communication may also be achieved through any application that can transmit data to or retrieve data from a server asynchronously without interfering with the display and behavior of data on the client 102.

The first input may indicate how to sort the records to create an ordering thereof. The first input may be interpreted to determine a sort key. In various embodiments, the first input may be a selection from a predetermined group of options displayed on the client 102. The first input may identify a field of the records. In a property management context, in some embodiments, the field may be the property name, property address, market rent, size of the property, default security deposit, or property owner. In an accounting context, in some embodiments, the field may be the transaction type, transaction amount, financial account number, payor, or payee. In an inventory management context, in some embodiments, the field may be the product name, product type, vendor, quantity, retail price, storage location, or date of receipt.

In many embodiments, the user may customize the first input by entering alphanumeric text, for example, at the client to indicate how to sort the records. In numerous embodiments, the first input may indicate whether records will be sorted in ascending or descending order. The first input may include an instruction indicating whether the records should be sorted in ascending or descending order. The first input may include an instruction to change a parameter stored on the data server 100 indicating whether sorting occurs in ascending or descending order. The instruction may change the parameter from ascending to descending order, or vice versa.

The second input associated with an index into the ordered records may indicate the position in the ordered records the user wishes to view. In some embodiments, the second input may be associated with a relative position. For example, the second input may include an x- or y-coordinate associated with a position of a scrollbar along a track on a user interface displayed at the client 102. The coordinate may correspond to a record whose position within the ordered records reflects the position of the scrollbar along the track. In some embodiments, the second input may be associated with an absolute position. For example, the second input may be a number indicating the numerical position of a record.

The third input associated with a size of a memory element associated with a web browser from a client may indicate the size of a screen buffer, or primary buffer, for the client's 102 display device. The third input may be used to determine the number or range of records that may be rendered for display. In some embodiments, the third input may also indicate the size of a secondary buffer on the client. The size of the secondary buffer may be used to determine the number or range of records that may be rendered and stored on the client without being displayed.

After receiving a first input associated with an ordering for records, a second input associated with an index into the ordered records, and a third input associated with a size of a memory element associated with a web browser from a client, the processor 125 may order the records according to the first input (step 203). The processor 125 may interpret the first input to determine a sort key for a sorting algorithm. The sort key may include the field used as the basis for sorting. The sort key may also indicate whether the records would be sorted in numerical order, lexicographical order, or any other known order. The processor 125 may order the records using any known algorithm for sorting data. The processor 125 may order the records according to any method that includes insertion, exchange, selection, merging, or any combination thereof. The processor 125 may select a sorting algorithm according to any criteria, such as the number of records. In various embodiments, the processor 125 may select a bubble sort, insertion sort, shell sort, merge sort, heap sort, quick sort, bucket sort, radix sort, distribution sort, shuffle sort, or any other type of sorting algorithm. In some embodiments, the processor 125 may select a stable or unstable sorting algorithm. In many embodiments, the processor 125 may select a sorting algorithm with one sort key, i.e., a primary key. In many embodiments, the processor 125 may select a sorting algorithm with a secondary key, a tertiary key, and so on. In various embodiments, any keys other than the primary key may be default keys according to the data server 100.

In various embodiments, the processor 125 may determine that the sorting algorithm results in equally ranked records. For example, if the sort key is "Property Owner," all records with the same owner will be equal, although further embodiments that use secondary keys to sort otherwise equal records for a secondary sub-ordering may be contemplated. When the algorithm produces equal records, the processor 125 may group the equal records together. The processor 125 may include an indication that the records are grouped and the number of records within the group. In one example, the processor 125 may group property records with the same owner, the same street address, the same rental price, or any other field. In another example, the processor 125 may group inventory records with the same vendor, the same date of receipt, the same storage, or any other field. In yet another example, the processor 125 may group transaction records with the same financial account number, payor, payee, or any other field. The indications may be used when rendering records for display, as described in more detail below.

In some embodiments, the processor 125 may directly access records in the database 106 to perform the sorting. In other embodiments, the processor 125 may load partial or entire records into a buffer. The processor 125 may load entire records to sort. The processor 125 may load an identifier of each record and data in the record, according to the first input, to be used for ordering. In some embodiments, the identifier may be the record's location in the database's 106 memory. In other embodiments, the identifier may be the position of the record in the records' default ordering.

After ordering the records according to the first input, the processor 125 may determine a subset of the ordered records to render according to the second and third inputs (step 205). The processor 125 may use the second input to determine a lower bound of the subset of ordered records to render. The processor 125 may use the third input to determine the upper bound. The processor 125 may render the subset of ordered records to create data for display on the client 102.

In various embodiments, the processor 125 may use the second input to identify the first record, i.e. a lower bound, for a subset of the ordered records to render for display. The second input may be a number indicating a position within the ordered records. In these embodiments, the processor 125 may identify the record in the ordered records whose position equals the value of the second input as the lower bound. In various embodiments, the second input may be an x- or y-coordinate associated with a position of a scrollbar along a track on a user interface displayed at the client 102. The processor 125 may identify as the lower bound the record whose position corresponds to the position of the scrollbar along the track. In some embodiments, the processor 125 may perform a calculation according to the coordinate and the coordinates associated with the track. The calculation may divide the difference between the coordinate of the scrollbar and the least of the coordinates associated with the track by the difference between the greatest and least coordinates for the track. The calculation may multiply the result by the number of records to approximate a position within the ordered records. The calculation may round the product up or down to the nearest integer. The processor 125 may identify as the lower bound the record within the ordered records according to the results of the calculation. In any of these embodiments, the processor 125 may identify the record via a look-up table, calculating an offset from the first record of the ordered records, or any other means.

In numerous embodiments, the processor 125 may use the third input to identify the last record, i.e. an upper bound, for a subset of the ordered records to render for display. The third input may also be used to determine the number of records in the subset. In some embodiments, the third input indicates the size of a screen buffer, or primary buffer, for the client's 102 display device. The processor 125 may also determine from the size of the screen buffer the number of records that may be rendered for display.

In various embodiments, the processor 125 may identify the upper bound and/or determine the number of records in the subset according to whether the sorting algorithm created groups. In some embodiments, when the sorting did not create groups, the processor 125 may divide the size of the screen buffer by a known size of a record when rendered to determine the number of records in the subset. The processor 125 may identify the upper bound by offsetting the lower bound by the determined number of records. In these embodiments, the processor 125 may iteratively progress from the lower bound to the upper bound of the subset, rendering each record in the subset for display according to a uniform format. The processor 125 may store the rendered records and identities of the bounds in a buffer.

If the sorting created groups, the processor 125 may require a more complex method to identify the upper bound and determine the number of records to be rendered. In these embodiments, the processor 125 may render records iteratively from the lower bound and use a counter to track the number of records rendered. Each rendered record may include three components: a header, an entry, and an offset. If a record does not belong to a group, the processor 125 may render the record in a format for a sole record. The processor 125 may create and populate a header with data from a field of the record, such as the field corresponding to the sort key. The processor 125 may create and populate an entry with data from the fields of the record. In some examples, if the sort key is "Property Owner," the processor 125 may create and populate a header with the property owner's name and include data such as the rental price, size, street address, and required security deposit for the property in the entry. In other examples, if the sort key is "Vendor," the processor 125 may create and populate a header with a vendor's name and include data such as the product name, product type, quantity, retail, storage location, and date of receipt in the entry. In further examples, if the sort key is "Payor," the processor 125 may create and populate a header with a payor's name and include data such as the transaction type, transaction amount, financial account number, and payee in the entry. The processor 125 may create an offset to separate the rendered record from the next record or group of records to display. The processor 125 may store the rendered record in a buffer to transmit to the client. The processor may 125 increment the counter before progressing to the next record or group.

If a record belongs to a group, the processor 125 may render the records in the group together. In some embodiments, the processor 125 may begin rendering with the record identified using the second input. In other embodiments, the processor 125 may determine that the identified record is not the first record in a group and elect to begin rendering with the first record. The processor 125 may create and populate a header with data from a field of the record, such as the field corresponding to the sort key. For each record in the grouping, the processor 125 may create and populate an entry with data from the fields of the record. After creating an entry, the processor 125 may increment the counter to track the number of processed records for rendering.

In some embodiments, the processor 125 may calculate a subtotal by summing data for a selected field of the records. In a property management context, the processor 125 may sum the monthly rental prices of the properties with a common owner to determine the monthly income stream from the group. The processor 125 may sum management fees for properties with a common owner to determine fees due from the owner. In an accounting context, the processor 125 may sum transaction amounts made from the same financial account number or payor to assess cashflow. In an inventory management context, the processor 125 may sum quantities of products stored at the same location to estimate residual storage capacity at the location. The processor 125 may render an entry to present the subtotal. The processor 125 may create an offset to separate the rendered records from the next record or group of records to display. The processor 125 may store the rendered records in a buffer to transmit to the client.

In any of the embodiments, during any step of the rendering, the processor 125 may determine if a rendered component would fill the remainder of the screen buffer. The processor 125 may use a parameter to account for the amount of memory each component would occupy before proceeding to the next component or the next record. If the component would not fill the screen buffer, the processor 125 may store the component in the buffer and render the next component. If the component would fill the screen buffer, the processor 125 may stop rendering.

In many embodiments, the processor 125 communicates with the database 106 to retrieve records associated with the first, second, and third inputs received from the client 102. In various embodiments, the processor 125 formulates an SQL query to the database 106 according to the inputs. In many embodiments, the processor 125 may formulate a query using any database computer language for managing data in relational database management systems, such as MySQL, Oracle, Clarion, Clipper, dBase, M, SPARQL, Tutorial D, Visual FoxPro, or WebQL. The database 106 may order the records according to the query and return a table with the records, beginning with the record corresponding to the index. The processor 125 may render the records in the table according to any of the methods described herein.

The third input may also indicate the size of a secondary buffer on the client. The processor 125 may use the size of the secondary buffer and the lower and upper bounds of the subset to determine records to render and cache on the client without being displayed. The determined records may be proximate to the subset of records. The processor 125 may identify a second lower bound and a second upper bound of records associated with the secondary buffer. The processor 125 may store the rendered records in a buffer to transmit to the client.

In many embodiments, the processor 125 may divide the size of the secondary buffer in half, and the quotient may be used to identify the second lower and second upper bounds. In some embodiments, the processor 125 may use the quotient to render records preceding the first lower bound. If the processor 125 reaches the first record of the ordered records before exhausting the quotient, the remaining memory may be allocated to records following the first upper bound. Similarly, if the processor 125 reaches the last record of the ordered records before exhausting the quotient, the remaining memory may be allocated to records preceding the first lower bound. In any of these embodiments, the processor 125 may identify which rendered records for the secondary buffer precede the displayed subset and which follow. The processor 125 may transmit indications of the identities to the client.

The processor 125 may render the records for the secondary buffer and identify the second lower and upper bounds according to any of the methods used with respect to the screen buffer and the first lower and upper bounds. When rendering records preceding the subset for display, the processor 125 may render components in reverse order. For example, the processor 125 may first render an offset for the secondary buffer before rendering entries for records. The processor 125 may also determine if the first component rendered for the screen buffer belongs to a group, i.e. if the display would begin depicting records from the middle of a group. In these embodiments, the processor 125 may render all the records in the group preceding the first component before rendering the header and an offset to separate the group from additional preceding records.

In many embodiments, the processor 125 communicates with the database 106 to retrieve records proximate to the records for display on the client 102. In some embodiments, the processor 125 may formulate the SQL query that retrieves records for display to also retrieve records to be cached on the client 102. The database 106 may return a table of records, in which the first predetermined number of records and the last predetermined number of records are cached on the client 102. In other embodiments, the processor 125 may formulate a separate SQL query to retrieve records proximate to the records for display. The database 106 may return a table for records preceding those for display and another table for records following those for display. The database 106 may return a table with both the records preceding and following the records for display. The table may include an indicator separating the two sets of records. The processor 125 may then render the records in the table for caching on the client 102.

After determining a subset of the ordered records to render according to the second and third inputs (step 205), the processor 125 may transmit the rendered subset of the ordered records for display on a web browser at the client (step 207). The processor 125 may transmit rendered records in a buffer and the lower and upper bounds of the subset of ordered records. In some embodiments, the processor 125 may transmit the lower bound and the number of records in the subset. The processor 125 may also transmit the rendered records for the secondary buffer on the client. The processor 125 may transmit rendered records in a buffer, the second lower and upper bounds of the rendered records, and indications of which rendered records precede the subset for display and which follow. The processor 125 may transmits the rendered records using an HTTP response, an Ajax response, or a response according to any other application that can transmit data to or retrieve data from a server asynchronously without interfering with the display and behavior of data on the client 102.

Referring now to FIGS. 3A and 3B, example displays 300 of rendered records that does not exhibit groups or offsets is shown and described. In this embodiment, the display 300 has sorted the records by property name. The display 300 includes fields such as the property name 310, market rent 315, number of units 320, square footage 325, management fee 330, minimum fee 335, reserve 340, insurance expiration date 345, tax year end 350, property owner 355, and property description 360. Each entry in the display 300 corresponds to a record, and the fields are populated with data from the record.

Referring now to FIGS. 4A and 4B, example displays 400 of rendered records that exhibit groups and subtotals is shown and described. In this embodiment, the display 400 has sorted the records by unit name. The display 400 includes fields such as the unit name 410, market rent 415, default deposit 420, square footage 425, number of bedrooms 430, number of bathrooms 435, unit type 440, and unit description 445. Each entry in the display 400 corresponds to a record, and the fields are populated with data from the record. The display 400 also demonstrates how units may be grouped, such as group 455. The display also demonstrates how subtotals may be rendered, such as subtotal 460 for the total square footage of units in the group.

Figure 5:
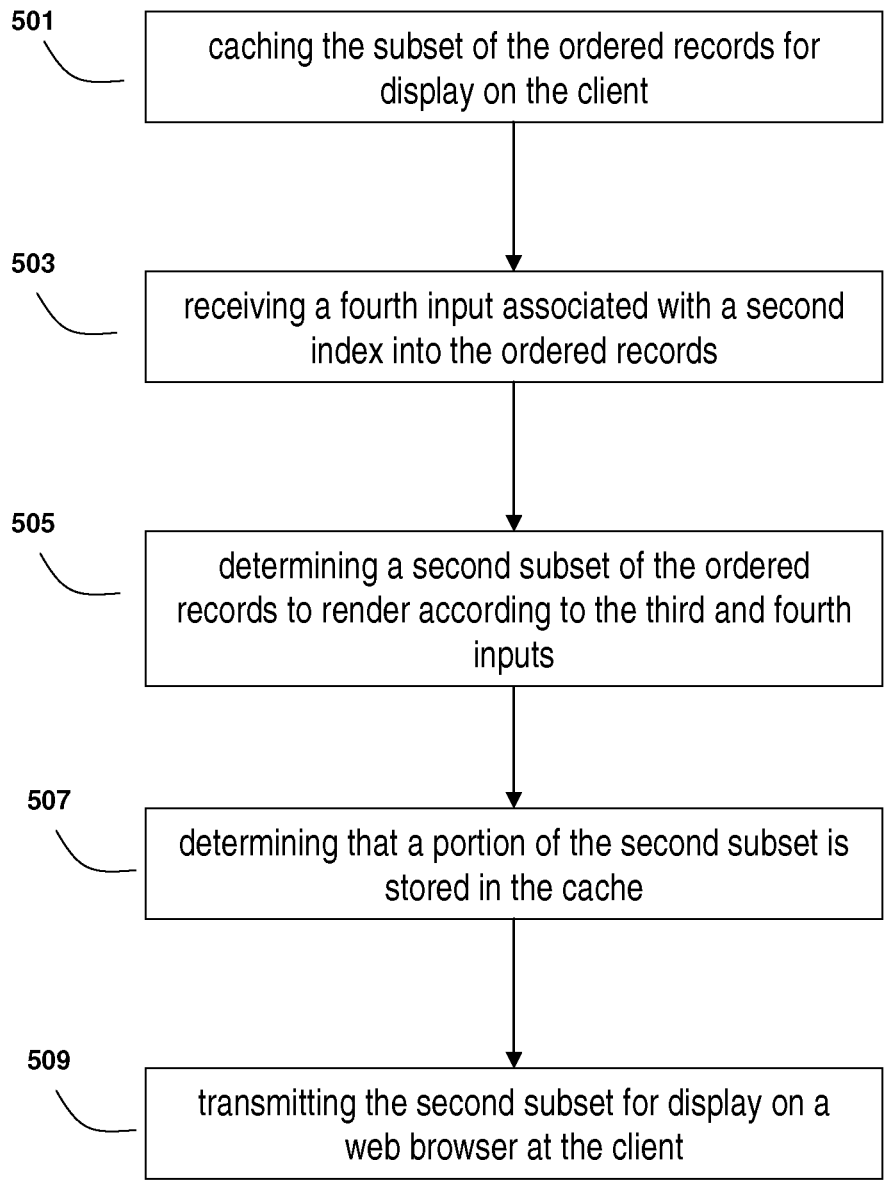
FIG. 5 is a flow diagram of a method for sorting, grouping, and rendering subsets of large datasets, including caching the rendered subsets, over a network.

Referring now to FIG. 5, a flow diagram of a method for sorting, grouping, and rendering subsets of large datasets, including caching the rendered subsets, over a network is shown. In brief overview, the method comprises: caching the subset of the ordered records for display on the client (step 501); receiving a fourth input associated with a second index into the ordered records (step 503); determining a second subset of the ordered records to render according to the third and fourth inputs (step 505); determining that a portion of the second subset is stored in the cache (step 507); and transmitting the second subset for display on a web browser at the client (step 509).

Still referring to FIG. 5, now in greater detail, a method for sorting, grouping, and rendering subsets of large datasets, including caching the rendered subsets, over a network comprises caching the subset of the ordered records for display on the client (step 501). The processor 125 may cache the subset according to any of the methods described in reference to FIG. 2.

After caching the subset of the ordered records for display on the client, the processor 125 may receive a fourth input associated with a second index into the ordered records (step 503). In various embodiments, the data server 100 may receive the fourth input. The server 100 may receive the fourth input according to any communication protocol, including specialized protocols, for communicating with a client 102. The fourth input associated with the second index may indicate a second subset of the ordered records the user at a client wishes to view. Like the second input, the fourth input may correspond to a position within the records. The fourth input may include an x- or y-coordinate associated with a position of a scrollbar along a track. In some embodiments, the fourth input may be associated with an absolute position, such as a number indicating the numerical position of a record.

After receiving a fourth input associated with a second index, the processor 125 may determine a second subset of the ordered records to render according to the third and fourth inputs (step 505). The processor 125 may use the fourth input to determine a lower bound of the second subset of ordered records to render. The processor 125 may use the third input to determine the upper bound. In these embodiments, when the processor 125 has previously rendered a first subset according to the ordering of the first input, the processor 125 may determine the upper and lower bounds of the second subset before rendering records for display.

The processor 125 may use the fourth input to identify a lower bound, i.e. a first record, in a second subset of the ordered records to render for display. The processor 125 may use any of the methods that used the second input to identify a record, as described in reference to FIG. 2.

The processor 125 may use the third input to determine the number of records for display and/or to identify the upper bound, i.e. the last record, in the second subset. If the ordering did not create groupings, the processor 125 may identify the last record using the number of records to render previously determined by dividing the size of the screen buffer by the known size of a record when prepared for display. The processor 125 may add the number of records to render to the position of the identified first record to determine the identity of the last record for the second subset.

If the sorting created groups, the processor 125 may progress through records iteratively to identify the upper bound and the number of records in the second subset. The processor 125 may use a counter to track the number of records the second subset would contain. The processor 125 may use a parameter to track the amount of memory that would be occupied or remaining in a screen buffer on the client. The processor 125 may begin with the record at the identified lower bound. If the record does not belong to a group, the processor 125 may increment the counter. The processor 125 may use the parameter to account for the amount of memory a header, entry, and/or offset for a single, ungrouped record would occupy before proceeding to the next record in the ordered records.

If the record belongs to a group, the processor 125 may determine whether to begin rendering at the identified lower bound or the first record in the group, according to any of the methods described in reference to FIG. 2. The processor 125 may use the parameter to account for the amount of memory a header for the grouping would occupy. For each record in the grouping, the processor 125 may increment the counter and use the parameter to account for the amount of memory a rendered entry would occupy. The processor 125 may account for the amount of memory a rendered offset would occupy before proceeding to the next record. During any portion of the rendering, the processor 125 may determine if a component would fill the remainder of the screen buffer. If the component would not fill the screen buffer, the processor 125 may continue rendering the next component, but if so, the processor 125 may stop the rendering.

After determining a second subset of the ordered data to render according to the third and fourth inputs, the processor 125 may determine that a portion of the second subset of the ordered data is stored in the cache (step 507). The processor 125 may determine that records in the first subset overlap records in the second subset according to any method. The processor 125 may determine that overlap occurs if the lower bound of the second subset is greater than the lower bound but less than the upper bound of the first subset. In these embodiments, the records from the lower bound of the second subset through the upper bound of the first subset have already been rendered for display. The processor 125 may further determine that records in the second subset overlap records in the secondary buffer. In these embodiments, the subset of records already rendered may be bounded by the upper bound of the subset of records rendered for display and the upper bound of the second subset or the upper bound of the records in the secondary buffer, whichever is lower.

The processor 125 may determine that overlap occurs if the upper bound of the second subset is greater than the lower bound but less than the upper bound of the first subset. In these embodiments, the records from the lower bound of the first subset through the upper bound of the second subset have already been rendered for display. The processor 125 may further determine that records in the second subset overlap records in the secondary buffer. In these embodiments, the subset of records already rendered may be bounded by the lower bound of the records in the secondary buffer or the lower bound of the second subset, whichever is lower, and the lower bound of the subset of records rendered for display In various embodiments, a web browser on the client 102 receives the fourth input and determines if the corresponding second subset of records are stored on the client 102. The web browser may determine that a portion of the second subset is cached on the client and transmit the determination to the data server 100. In response, the processor 125 may formulate a query to the database 106 to retrieve the remaining records in the second subset and retrieve records proximate to the second subset for caching on the client 125. The processor 125 may render the retrieved remaining records in the second subset for display according to any of the methods described herein.

After determining that a portion of the second subset is stored in the cache, the processor 125 may transmit the second subset for display on a web browser at the client (step 509). In various embodiments, the processor 125 may transfer rendered records from the first subset that overlap the second subset into updated positions in the screen buffer. The processor 125 may render records for the remaining records in the second subset and/or render proximate records to update the secondary buffer, according to any of the methods described in reference to FIG. 2. In some embodiments, the processor 125 may transmit all the rendered data in the screen buffer to the client 102. In other embodiments, the processor 125 may transmit instructions to the client identifying rendered records in the primary and secondary buffers and their new locations in the buffers according to the second subset. For example, the processor 125 may indicate the current and updated locations for each rendered record in the buffers. The client 102 may update the buffers according to the instructions.

Figure 6:
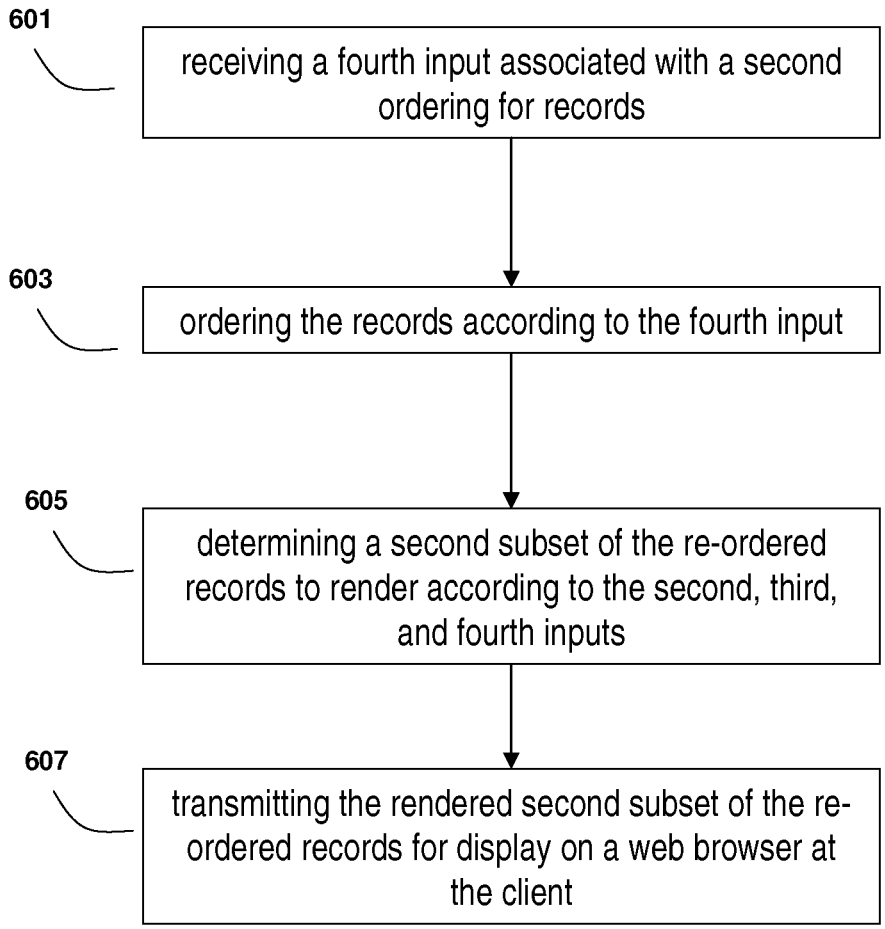
FIG. 6 is a flow diagram of a method for sorting, grouping, and rendering subsets of large datasets, including re-ordering the records and determining a new subset of records, over a network.

Referring now to FIG. 6, a flow diagram of a method for sorting, grouping, and rendering subsets of large datasets, including re-ordering the records and determining a new subset of records, over a network is shown. In brief overview, the method comprises: receiving a fourth input associated with a second ordering for records (step 601); ordering the records according to the fourth input (step 603); determining a second subset of the re-ordered records to render according to the second, third, and fourth inputs (step 605); and transmitting the rendered second subset of the re-ordered records for display on a web browser at the client (step 607).

Still referring to FIG. 6, now in greater detail, a method for sorting, grouping, and rendering subsets of large datasets over a network comprises receiving a fourth input associated with a second ordering for records (step 601). In various embodiments, the data server 100 may receive the fourth input. The data server 100 may receive the fourth input according to any protocol or any application that can transmit data to a server asynchronously without interfering with the display and behavior of data on the client 102. The fourth input may indicate how to sort the records to create a second ordering thereof. The fourth input may be interpreted to determine a sort key according to any of the methods described in reference to FIG. 2.

After receiving a fourth input associated with a second ordering for records, the processor 125 may order the records according to the fourth input (step 603). The processor 125 may apply a sorting algorithm to the records using the sort key determined from the fourth input according to any of the methods described in references to FIG. 2. In some embodiments, the sorting algorithm may group sorted records. In other embodiments, the sorting algorithm may not group sorted records.

After ordering the records according to the fourth input, the processor 125 may determine a second subset of the re-ordered records to render according to the second, third, and fourth inputs (step 605). The processor 125 may re-use the second input for the lower bound of the second subset of re-ordered records to render. The processor 125 may use the third input to determine a new upper bound for the second subset. The processor 125 may render the second subset of re-ordered records to create data for display on the client 102.

The processor 125 may re-use the second input for identifying a record associated with the lower bound of the second subset of the ordered records. The processor 125 may use the third input to determine a new upper bound for the second subset. The processor 125 may determine the new upper bound according to any of the methods described in reference to FIG. 2. However, because the order of the records has changed, the number of records in the second subset may differ from the first subset. The number of records may depend on the number and size of groups of records proximate to the record associated with the lower bound. The processor 125 may render the records in the second subset according to any of the methods described herein. Because the records have been re-ordered, the records located between the lower and upper bounds may be entirely different from the records in the first subset or the records between the same bounds in any other ordering. The processor 125 may calculate and/or insert offsets based on the number and groupings of records in the second subset of the re-ordered records, according to any of the methods described in reference to FIG. 2. The processor 125 may also re-calculate subtotals by summing data for one or more selected fields of the records in the second subset of the re-ordered records, according to any of the methods described in reference to FIG. 2.

In many embodiments, the processor 125 may communicate with the database 106 to retrieve records associated with the second, third, and fourth inputs received from the client 102. In various embodiments, the processor 125 formulates an SQL query to the database 106 according to the inputs. In many embodiments, the processor 125 may formulate a query using any database computer language for managing data in relational database management systems, such as MySQL, Oracle, Clarion, Clipper, dBase, M, SPARQL, Tutorial D, Visual FoxPro, or WebQL. The database 106 may order the records according to the query and return a table with the records, beginning with the record corresponding to the index. The processor 125 may render the records in the table according to any of the methods described herein.

After determining a second subset of the ordered records to render according to the second, third, and fourth inputs, the processor 125 may transmit the rendered second subset of the re-ordered records for display on a web browser at the client (step 607). The processor 125 may transmit the rendered second subset according to any of the methods described in reference to FIG. 2.

Figure 7:
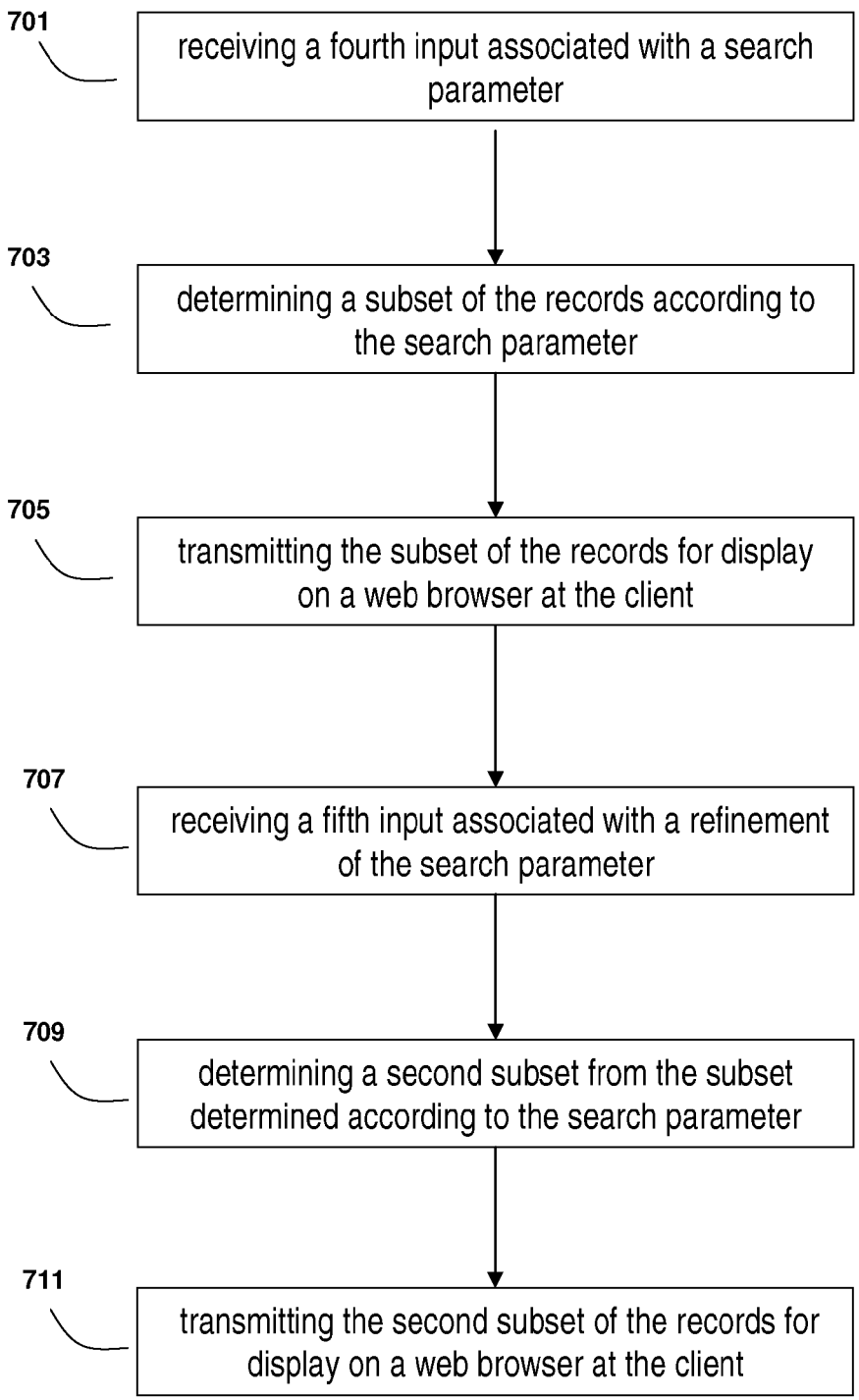
FIG. 7 is a flow diagram of a method for iteratively searching large datasets over a network.

Referring now to FIG. 7, a flow diagram of a method for iteratively searching large datasets over a network is shown. In brief overview, the method comprises: receiving a fourth input associated with a search parameter (step 701); determining a subset of the records according to the search parameter (step 703); transmitting the subset of the records for display on a web browser at the client (step 705); receiving a fifth input associated with a refinement of the search parameter (step 707); determining a second subset from the subset determined according to the search parameter (step 709); and transmitting the second subset of the records for display on a web browser at the client (step 711).

Still referring to FIG. 7, now in greater detail, a method for iteratively searching large datasets over a network comprises receiving a fourth input associated with a search parameter. The data server 100 may receive the fourth input. The server 100 may receive the input according to any communication protocol, including specialized protocols, for communicating with a client 102. The fourth input may include alphanumeric characters, symbols, spaces, punctuation marks, or any combination thereof.

The fourth input may be interpreted to determine a search parameter, such as a search key, for a search algorithm. In some embodiments, the processor 125 may use the search key to define a search space for the database 106 of records. In various embodiments, the processor 125 may determine the search key is sufficiently generic to define the search space as all the fields in all the records. In many embodiments, the processor 125 may determine the search key is specific to a field and define the search space as the specified fields for the records. For example, in a property management context, upon determining the search key is "Elm Street," the processor 125 may define the search space as the addresses of the record. Upon determining the search key is "John Doe," the processor 125 may define the search space as the property owners in the records. In an accounting context, upon determining the search key includes the word "Bank," the processor 125 may define the search space as the financial account or payor of the records. In an inventory management context, upon determining the search key includes the word "Boston," the processor 125 may define the search space as the storage location of the records.

After receiving a fourth input associated with a search parameter, the processor 125 may determine a subset of the records according to the search parameter (step 703) and transmit the subset of the records for display on a web browser at the client (step 705). The processor 125 may select a search algorithm according to any criteria. In various embodiments, the processor 125 may select an uninformed search, list search, tree search, graph search, informed search, adversarial search, or any other type of search algorithm. The processor 125 may store the search results. The processor 125 may render the search results for display and transmit the search results to the client according to any of the methods described in reference to FIG. 2. The processor 125 may also render search results for the secondary buffer.

In some embodiments, the processor 125 may directly access records in the database 106 to perform the search. In other embodiments, the processor 125 may load partial or entire records into a buffer. The processor 125 may load entire records to search. The processor 125 may load an identifier of each record and the data of the record relevant to the search space. In some embodiments, the identifier may be the record's location in the database's 106 memory. In other embodiments, the identifier may be the position of the record in the records' default ordering. In further embodiments, the identifier may be associated with the record's position in an ordering of sorted records.

After determining a subset of the records according to the search parameter and transmitting the subset of the records for display at the client, the processor 125 may receive a fifth input associated with a refinement of the search parameter (step 707), determine a second subset from the subset determined according to the search parameter (step 709), and transmit the second subset of the records for display on a web browser at the client (step 711).

The data server 100 may receive the fifth input according to any communication protocol, including specialized protocols, for communicating with a client 102. The fourth input may include alphanumeric characters, symbols, spaces, punctuation marks, or any combination thereof.

The fifth input may be interpreted to determine a search parameter, such as a search key, for a search algorithm. The search key may be a refinement of the search key from the fourth input. The processor 125 may recognize that the search key from the fifth input may leverage the results of the search associated with the fourth input. The processor 125 may define the search space as the search results associated with the fourth input. For example, in a property management context, if the fourth input is "Elm Street" and the fifth input is "Elm Street Boston," the fourth input may have defined the search space as the addresses in the records and determined a subset of records whose properties are located on "Elm Street." The subset may be used as the search space for a refined search according to the fifth input.

After defining the search space for the fifth input, the processor 125 may apply the search algorithm with the refined search key to the refined search space to determine the second subset. The processor 125 may store the search results. The processor 125 may render the search results for display and transmit the search results to the client according to any of the methods described in reference to FIG. 2. The processor 125 may also render search results for the secondary buffer.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of rendering a subset of ordered records on a web browser, the method comprising:
   receiving, by a server:
   a first input associated with an ordering for records,
   a second input associated with an index into the ordered records,
   a third input identifying a size of a memory element for a web browser at a client, the memory element comprising a primary buffer storing data for display by the web browser, and
   a fourth input comprising a location indicator associated with a position of a scrollbar in the web browser;
   ordering, by the server, the records according to the first input;
   determining, by the server, a subset of the ordered records to render according to the second, third, and fourth inputs, wherein at least the third input is used, by the server, to determine a number of records for the subset; and
   transmitting, by the server, a rendered subset of the ordered records for display by the web browser.

2. The method of claim 1, further comprising:
   caching, by the server, the subset of the ordered records for display on the web browser.

3. The method of claim 2, further comprising:
   receiving, by the server, a fifth input associated with a second index into the ordered records;
   determining, by the server, a second subset of the ordered records to render according to the fifth, third, and fourth inputs;
   determining, by the server, that a portion of the second subset is stored in the cache; and
   transmitting, by the server to the client, the portion of the second subset from the cache.

4. The method of claim 1, further comprising:
   receiving, by the server, a fifth input associated with a second index into the ordered records;
   determining, by the server, a second subset of the ordered records to render according to the fifth, third, and fourth inputs; and
   transmitting, by the server, the second subset of the records for display on a web browser at the client.

5. The method of claim 1, further comprising:
   receiving, by the server, a search parameter;
   determining, by the server, a second subset of the ordered records to render according to the search parameter; and
   transmitting, by the server, the second subset of the records for display on a web browser at the client.

6. The method of claim 5, further comprising:
   applying, by the server, a search algorithm using the search parameter to obtain a search result; and
   determining, by the server, the second subset of the ordered records based on the search result.

7. The method of claim 1, further comprising:
   calculating, by the server, a subtotal from fields in a group of records in the subset; and
   transmitting, by the server, the subtotal to the client.

8. The method of claim 1, further comprising:
   determining, by the server, a second subset of the ordered records proximate to the first subset; and
   transmitting, by the server, the second subset to the client for storage.

9. The method of claim 1, wherein the records are property records.

10. The method of claim 9, wherein the first input associated with the ordering for records identifies a property record field and ordering the records according to the first input includes sorting property records according to the identified property record field.

11. A computer implemented system for rendering a subset of ordered records on a web browser, the system comprising:
    a transceiver in communication with a client, the transceiver configured to receive inputs associated with a desired subset of records from a user at the client and to transmit subsets of records to the client for display on a web browser at the client; and
    a processor that is configured to receive: a first input associated with an ordering for records, a second input associated with an index into the ordered records, a third input identifying a size of a memory element for the web browser from the client, the memory element comprising a primary buffer storing data for display by the web browser, and a fourth input comprising a location indicator associated with a position of a scrollbar in the web browser; order the records according to the first input; and determine a subset of the ordered records to render according to the second, third, and fourth inputs, wherein at least the third input is used, by the server, to determine a number of records for the subset.

12. The system of claim 11, further comprising a cache that stores the subset of the records for display on the web browser.

13. The system of claim 12, wherein the processor is configured to receive a fifth input associated with a second index into the ordered records; determine a second subset of the ordered records to render according to the fifth, third, and fourth inputs; and determine that a portion of the second subset of the ordered records is stored in the cache; and the transceiver is configured to transmit the portion of the second subset from the cache to the client.

14. The system of claim 11, wherein the processor is configured to determine a second subset of the ordered records to render according to the third and fourth input and further according to a fifth input associated with a second index into the ordered records, and the transceiver is configured to transmit the second subset of the records for display on a web browser at the client.

15. The system of claim 11, wherein the processor is configured to receive a search parameter and determine a second subset of the ordered records to render according to the search parameter, and the transceiver is configured to transmit the second subset of the records for display on a web browser at the client.

16. The system of claim 15, wherein the processor is configured to apply a search algorithm using the search parameter to obtain a search result, and determine the second subset of the ordered records based on the search result.

17. The system of claim 11, wherein the processor calculates a subtotal from fields in a group of records in the subset and the transceiver transmits the subtotal to the client.

18. The system of claim 11, wherein the processor is configured to determine a second subset of the ordered records proximate to the first subset and the transceiver is configured to transmit the second subset to the client for storage.

19. The system of claim 11, wherein the records are property records.

20. The system of claim 19, wherein the first input associated with the ordering for records identifies a property record field and ordering the records according to the first input includes sorting property records according to the identified property record field.

* * * * *